(12) United States Patent
Hu

(10) Patent No.: US 7,980,740 B2
(45) Date of Patent: Jul. 19, 2011

(54) ILLUMINATING CASTER

(76) Inventor: An-Min Hu, Taipei (TW)

(*) Notice: Subject to any disclaimer, the term of this patent is extended or adjusted under 35 U.S.C. 154(b) by 258 days.

(21) Appl. No.: 12/485,926

(22) Filed: Jun. 17, 2009

(65) Prior Publication Data
US 2010/0321938 A1    Dec. 23, 2010

(51) Int. Cl.
*B60Q 1/26*    (2006.01)
(52) U.S. Cl. .................. 362/500; 362/544; 362/192
(58) Field of Classification Search .................. 362/192, 362/193, 500, 543–545
See application file for complete search history.

(56) References Cited

U.S. PATENT DOCUMENTS

| | | | |
|---|---|---|---|
| 6,398,395 B1* | 6/2002 | Hyun | 362/500 |
| 6,936,980 B2* | 8/2005 | Wang | 315/292 |
| 7,332,841 B2* | 2/2008 | Hsu | 310/73 |
| 2002/0181242 A1* | 12/2002 | Dai | 362/500 |
| 2005/0195612 A1* | 9/2005 | Cho | 362/500 |

* cited by examiner

*Primary Examiner* — Thomas M Sember

(57) ABSTRACT

An illuminating caster includes an at least translucent tire, a rim for supporting the wheel, a hub including slits defined therein, spokes extending to the rim from the hub, illuminating elements located in the vicinity of the tire and a generator. The generator includes a ring disposed in the hub, rods each extending to a related one of the illuminating elements from the ring through a related one of the slits, a circuit board disposed in the ring and connected to the illuminating elements, an annular shell disposed in the ring, a coil disposed in the annular shell and connected to the circuit board, a permanent magnet disposed in but separated from the coil and a lining provided between the permanent magnet and an axle.

10 Claims, 5 Drawing Sheets

ILLUMINATING CASTER

BACKGROUND OF THE INVENTION

1. Field of the Invention

The present invention relates to an illuminating caster for a buggy, a walker, a toy, a sports gear, a wheeled chair or a trolley and, more particularly, to a reliable illuminating caster.

2. Related Prior Art

A buggy, a walker, a toy, a sports gear, a wheeled chair or a trolley needs casters. Conventional casters are plain.

Some roller skaters are equipped with illuminating casters for decorative and signaling purposes. An illuminating caster includes illuminating elements and a small generator for energizing the illuminating elements. The small generator includes a coil, a permanent magnet and a circuit board. When the illuminating caster is rotated, there is relative rotation between the coil and the permanent magnet. Thus, electricity is generated to energize the illuminating elements.

The illuminating casters cold easily fail to illuminate after some time of use. The failure could be attributed to slacking of the elements relative to one another or breaking of some of the elements. The slacking or breaking could be attributed to vibration during the use of the roller skaters.

The present invention is therefore intended to obviate or at least alleviate the problems encountered in prior art.

SUMMARY OF THE INVENTION

It is the primary objective of the present invention to provide a buggy, a walker, a toy, a sports gear, a wheeled chair or a trolley with a reliable illuminating caster.

To achieve the foregoing objective, the illuminating caster includes an at least translucent tire, a rim for supporting the wheel, a hub including slits defined therein, spokes extending to the rim from the hub, illuminating elements located in the vicinity of the tire and a generator. The generator includes a ring disposed in the hub, rods each extending to a related one of the illuminating elements from the ring through a related one of the slits, a circuit board disposed in the ring and connected to the illuminating elements, an annular shell disposed in the ring, a coil disposed in the annular shell and connected to the circuit board, a permanent magnet disposed in but separated from the coil and a lining provided between the permanent magnet and an axle.

Other objectives, advantages and features of the present invention will be apparent from the following description referring to the drawings.

BRIEF DESCRIPTION OF THE DRAWINGS

The present invention will be described via detailed illustration of two embodiments referring to the drawings.

DETAILED DESCRIPTION OF THE EMBODIMENTS

Figure 4:
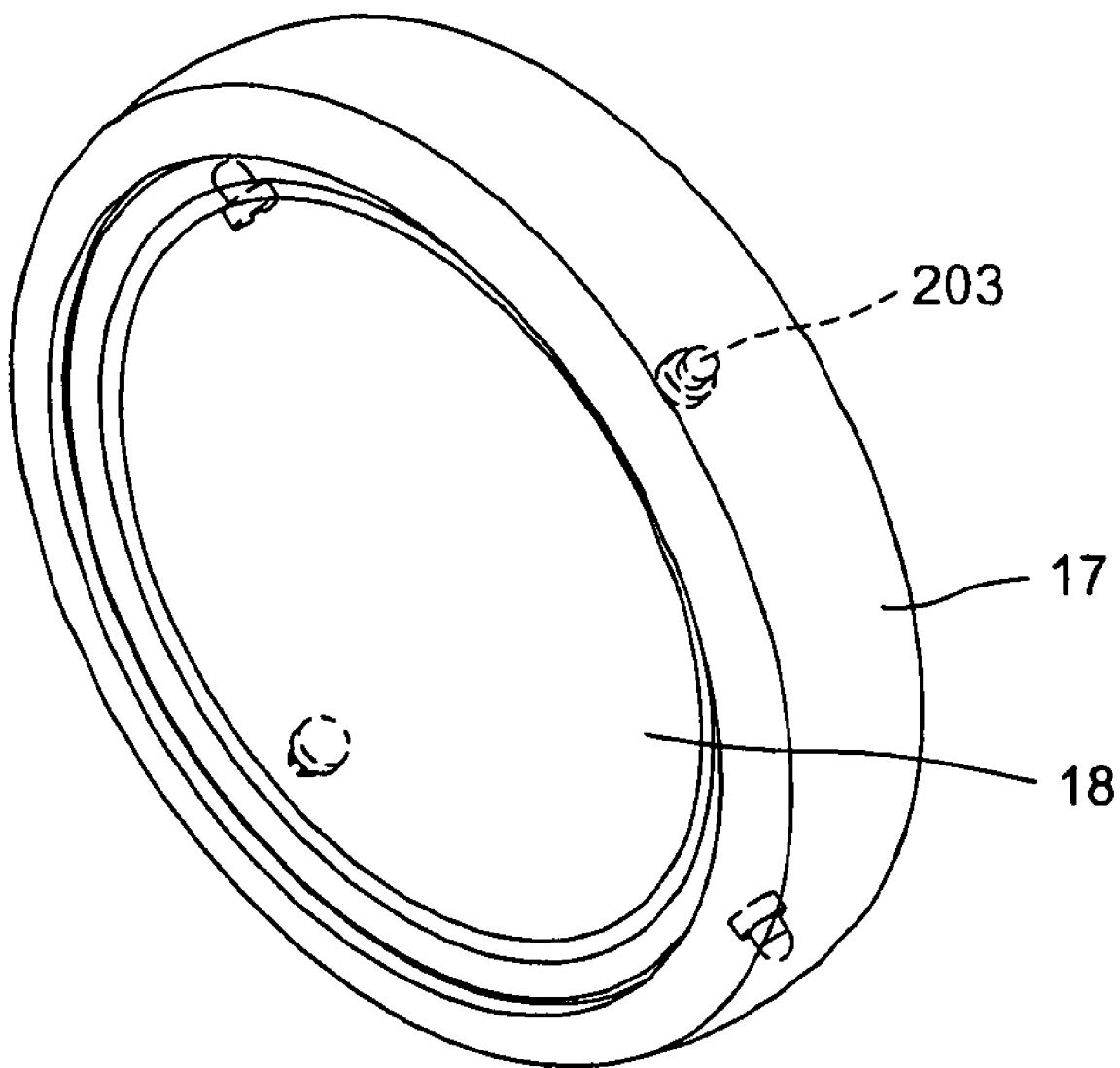
FIG. 4 is a perspective view of the illuminating caste shown in FIG. 3.

Referring to FIG. 4, there is shown an illuminating caster according to a first embodiment of the present invention.

Figure 2:
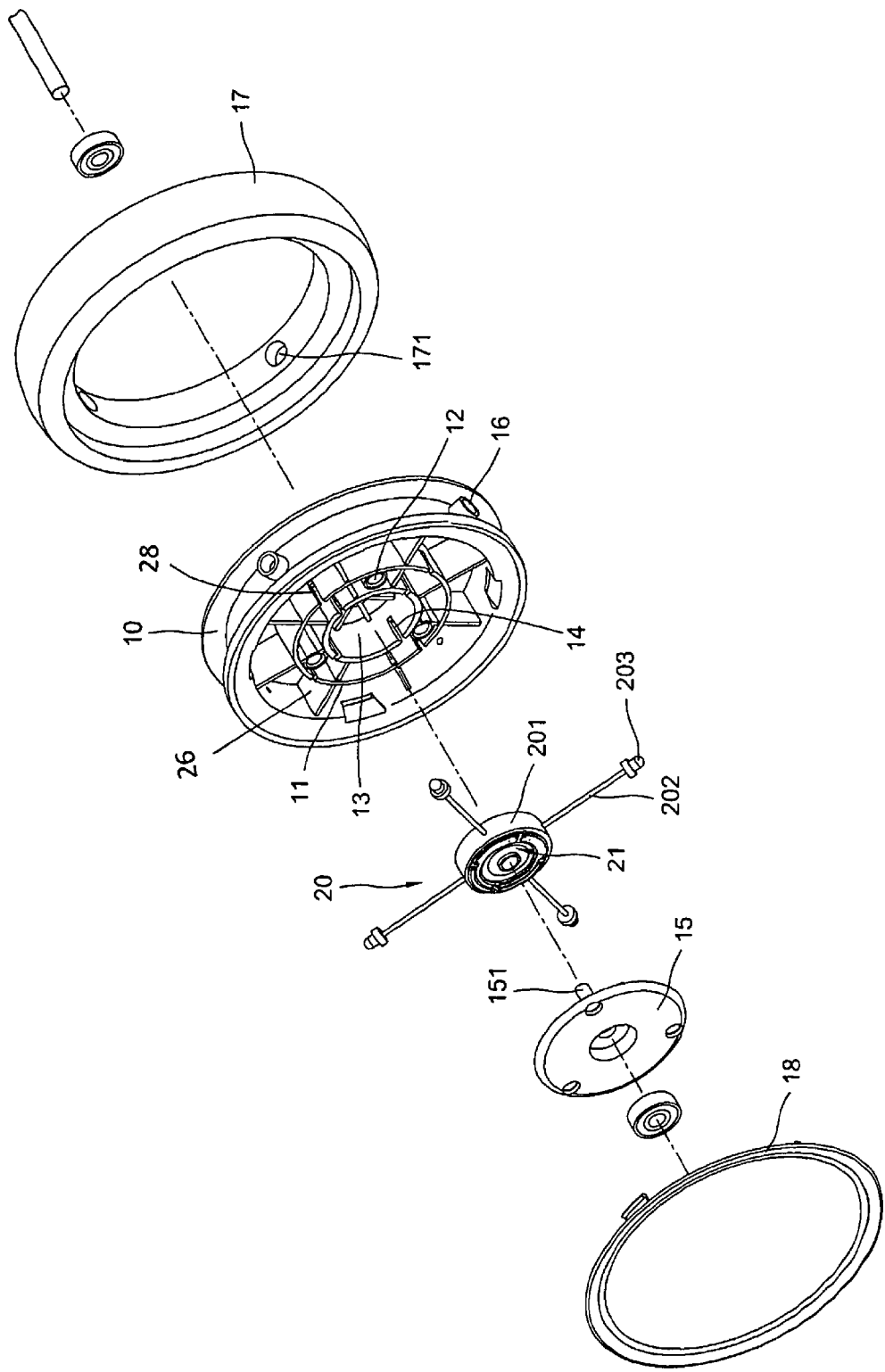
FIG. 2 is an exploded view of the illuminating caster shown in FIG. 1.
Figure 3:
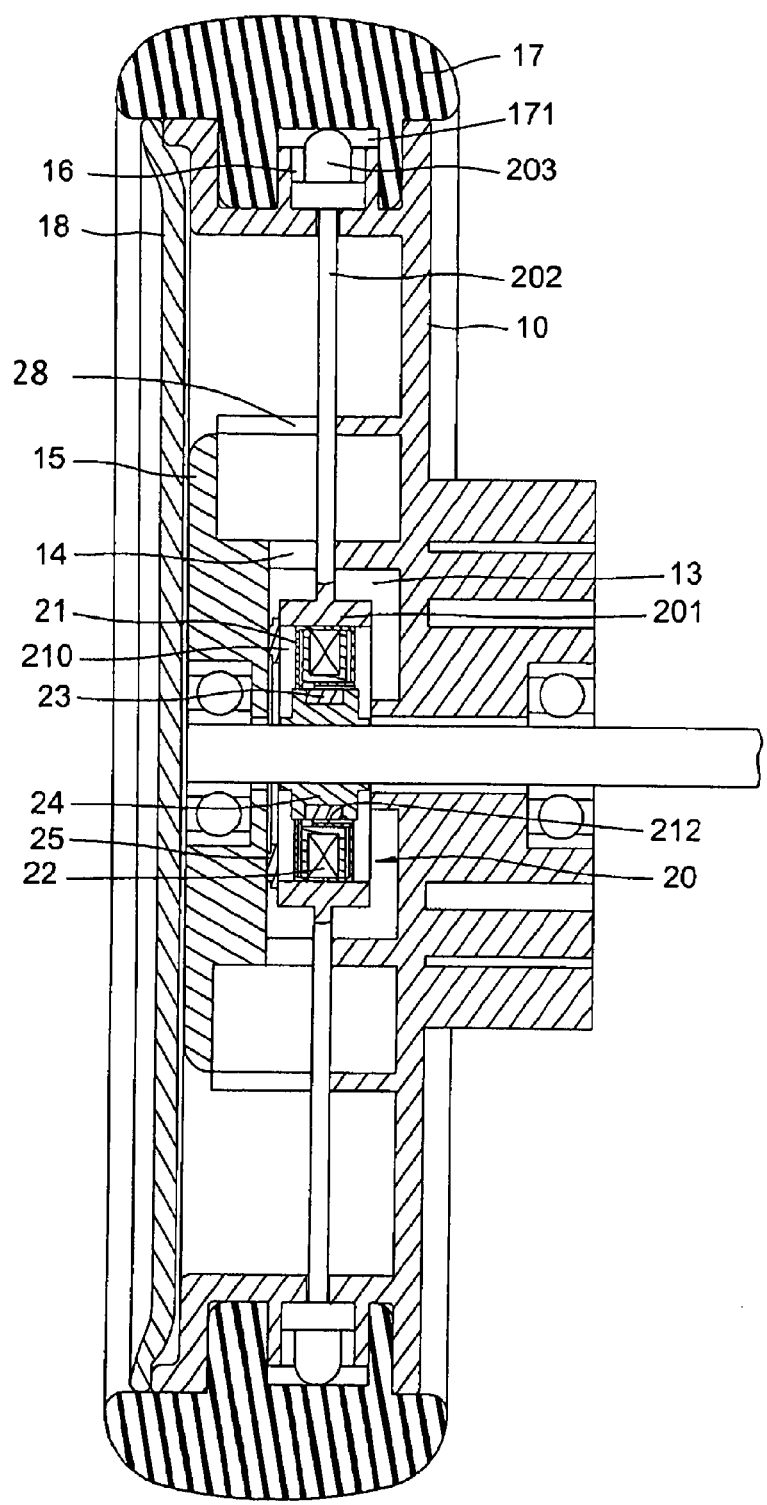
FIG. 3 is a cross-sectional view of the illuminating caster shown in FIG. 1.

Referring to FIGS. 2 and 3, the illuminating caster includes a rim 10, a tire 17 provided on the rim 10, illuminating elements 203 disposed in the tire 17 and a generator 20 disposed in the rim 10 and used to energize the illuminating elements 203. Spokes 26 are extended to the rim 10 from a hub 13. An annular rib 11 is formed between the rim 10 and the hub 13. Slits 28 are defined in the annular rib 11. The spokes 26 intersect with the annular rib 11. Slits 14 are defined in the hub 13. Cylinders 12 are formed around the hub 13. Apertures 16 are defined in the rim 10.

The tire 17 is made of a transparent or translucent material so that light emitted from the illuminating elements 203 can be seen through the tire 17. The tire 17 includes cavities 171 defined in an internal side thereof. The illuminating elements 203 are disposed in the cavities 171.

The illuminating elements 203 are preferably light-emitting diodes. However, the illuminating elements 203 can be any other proper illuminating elements.

Figure 1:
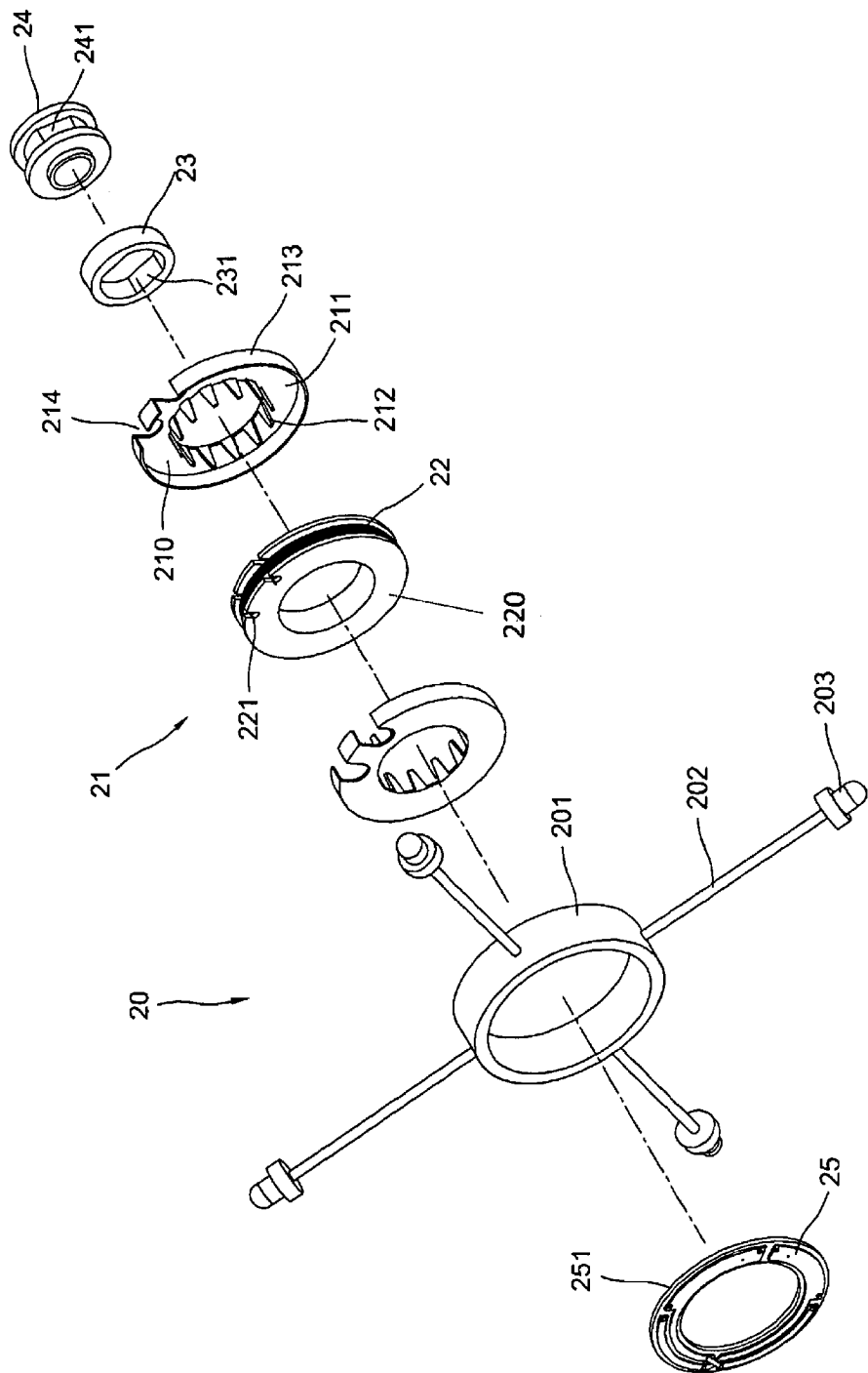
FIG. 1 is an exploded view of illuminating elements and a generator of an illuminating caster according to the first embodiment of the present invention.

Referring to FIG. 1, the generator 20 includes a ring 201, an annular shell 21 disposed in the ring 201, a coil 22 located in the annular shell 21, a permanent magnet 23 located in the coil 22, an annular lining 24 provided between the permanent magnet 23 and an axle, and a circuit board 25 provided between the illuminating elements 203 and the coil 22. A rod 202 is extended to each of the illuminating elements 203 from the ring 201.

The annular shell 21 includes an annular space 210 for containing the coil 22. The annular shell 21 includes two halves 211 joined together. Each half 211 of the annular shell 21 includes teeth 212 provided along an internal edge, a wall 213 formed along an external edge and two cutouts 214 defined therein. The teeth 212 of a half 211 of the annular shell 21 are engaged with the teeth 212 of the other half 211 of the annular shell 21. The annular shell 21 is made of metal. The magnetic polarity of the teeth 212 of a half 211 of the annular shell 21 is opposite to the magnetic polarity of the teeth 212 of the other half 211 of the annular shell 21.

The coil 22 is wound around a reel 220. The reel 220 includes two cutouts 221 defined therein.

The permanent magnet 23 is an annular element formed with two planar facets 231 on an internal side. The lining 24 is an annular element formed two planar facets 241 on an external side. The planar facets 231 are in contact with the planar facets 241 2hen the permanent magnet 23 is mounted on the lining 24, thus preventing relative rotation between the permanent magnet 23 and the lining 24.

A first cover 15 includes rods 151 extended from a side thereof. Each of the rods 151 is inserted in a related one of the cylinders 12, thus preventing relative rotation between the first cover 15 and the rim 10. That is, the first cover 15 is rotational together with the rim 10.

A second cover 18 includes projecting elements extending from a side thereof. The projecting elements of the second cover 18 is fit in a recess defined in the rim 10, thus avoiding relative rotation between the second cover 18 and the rim 10. That is, the second cover 18 is rotational together with the rim 10.

Referring to FIG. 3, the hub 13 is rotationally provided on the axle with a bearing, and the first cover 15 is rotationally provided on the axle with another bearing. The permanent magnet 23 is not rotational on the axle while the coil 22 is rotational relative to the axle. Thus, the coil 22 can be rotated relative to the permanent magnet 23 to generate electricity for energizing the illuminating elements 203.

Each of the rods 202 is inserted through a related one of the slits 14 and a related one of the slits 28 as the ring 201 is disposed in the hub 13 so that the generator 20 is rotational together with the rim 10. Each of the illuminating elements 203 is inserted in a related one of the cavities 171 via a related one 16 of the apertures 16.

Figure 5:
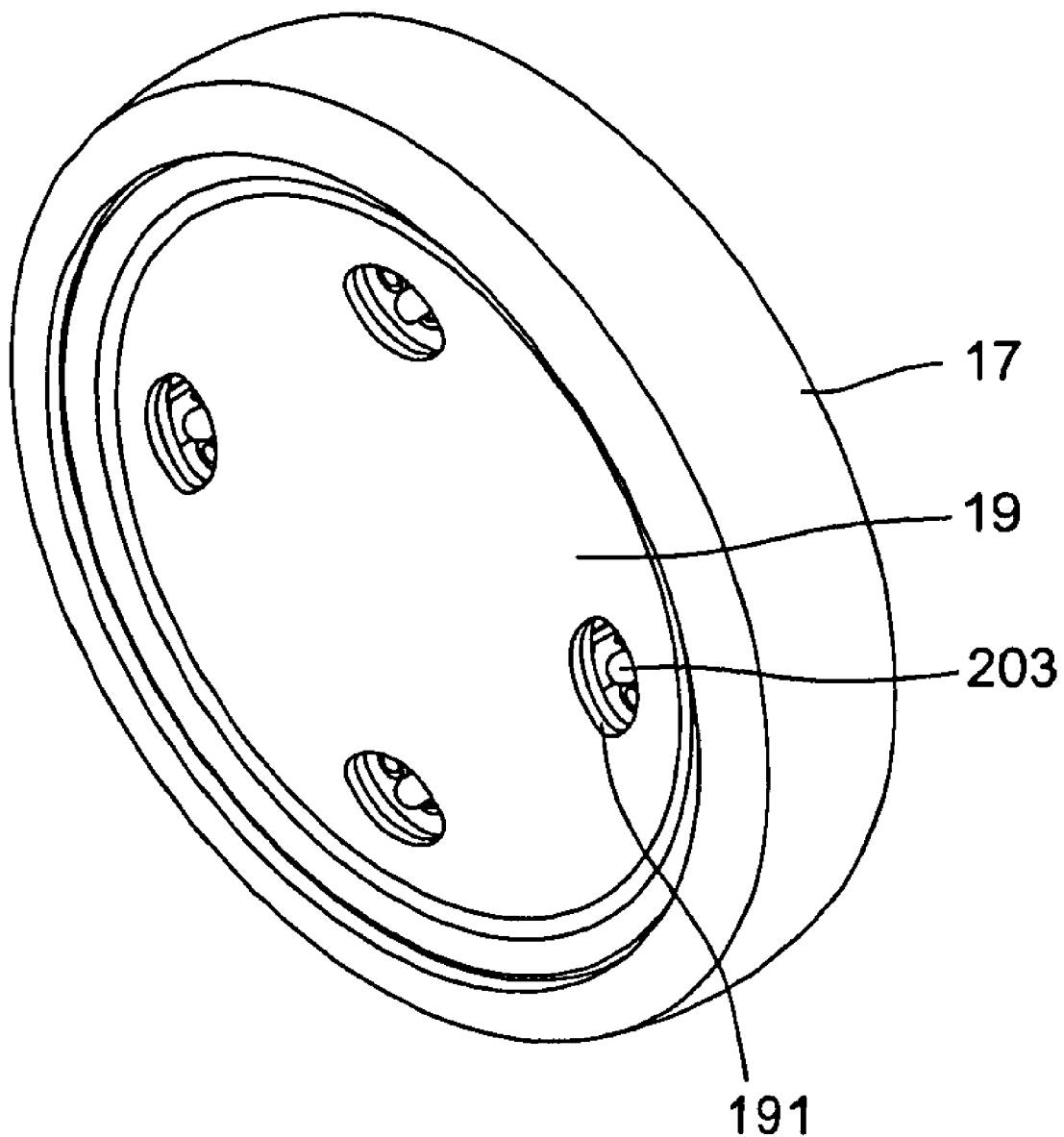
FIG. 5 is a perspective view of an illuminating caster according to the second embodiment of the present invention.

Referring to FIG. 5, there is shown an illuminating caster according to a second embodiment of the present invention. The second embodiment is like the first embodiment except including a second cover 19 instead of the second cover 18. The second cover 19 includes apertures 191 defined therein so that the light emitted from each of the illuminating elements 203 can be seen through a related one of the apertures 191. The cavities 171 are omitted since there are not needed.

The illuminating caster of the present invention is robust and hence reliable for at least two reasons. Firstly, the ring 201 protects the other elements of the generator 20. Secondly, the insertion of the rods 202 through the slits 14 and the slits 28 keep many of the elements in position relative to one another.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An illuminating caster comprising an at least translucent tire, a rim for supporting a wheel, a hub comprising slits defined therein, spokes extending to the rim from the hub, illuminating elements located in a vicinity of the tire and a generator comprising:
   a ring disposed in the hub;
   rods each extending to a related one of the illuminating elements from the ring through a related one of the slits;
   a circuit board disposed in the ring and connected to the illuminating elements;
   an annular shell disposed in the ring;
   a coil disposed in the annular shell and connected to the circuit board;
   a permanent magnet disposed in but separated from the coil; and
   a lining provided between the permanent magnet and an axle.

2. The illuminating caster according to claim 1, wherein the annular shell comprises two halves joined together.

3. The illuminating caster according to claim 2, wherein each of the halves of the annular shell comprises teeth formed along an internal edge, and the magnetic polarity of the teeth of one of the halves of the annular shell is opposite to the magnetic polarity of the teeth of the other half of the annular shell.

4. The illuminating caster according to claim 1 comprising a reel for supporting the coil, wherein the reel comprises at least one cutout defined therein, and the annular shell comprises at least one cutout defined therein for alignment with the cutout of the reel.

5. The illuminating caster according to claim 1, wherein the permanent magnet is an annular element with at least one planar facet on an internal side, and the lining is an annular element with at least one planar face on an external side for contact with the planar facet of the permanent magnet.

6. The illuminating caster according to claim 1 comprising a cover for protecting the generator in the ring.

7. The illuminating caster according to claim 6 comprising cylinders formed around the hub, wherein the cover comprises rods each inserted in a related one of the cylinders.

8. The illuminating caster according to claim 1, wherein the rim comprises apertures through which the rods extend, and the tire comprises cavities for receiving the illuminating elements.

9. The illuminating caster according to claim 1 comprising a cover for protecting the generator in the rim.

10. The illuminating caster according to claim 9, wherein the cover comprises apertures through which light emitted from the illuminating elements can be seen.

* * * * *